United States Patent [19]

Schäfer et al.

[11] Patent Number: 4,517,856
[45] Date of Patent: May 21, 1985

[54] POWER TAKE-OFF LEVER ARRANGEMENT FOR A TRACTOR

[75] Inventors: Helmut Schäfer, Ketsch; Volker Hückler; Michael Teich, both of Mannheim, all of Fed. Rep. of Germany

[73] Assignee: Deere & Company, Moline, Ill.

[21] Appl. No.: 397,637

[22] Filed: Jul. 12, 1982

[30] Foreign Application Priority Data

Aug. 3, 1981 [EP] European Pat. Off. ........ 81303548.2

[51] Int. Cl.³ ............................ G05G 5/08; F16B 3/00
[52] U.S. Cl. .............................. 74/528; 74/531; 74/475; 403/356
[58] Field of Search ............ 74/528, 476, 523, 531, 74/529, 527, 475; 403/356, 355, 93, 96

[56] References Cited

U.S. PATENT DOCUMENTS

| | | | |
|---|---|---|---|
| 2,775,134 | 12/1956 | Swenson | 74/476 |
| 3,648,536 | 3/1972 | Maina | 74/476 |
| 3,786,690 | 1/1974 | Bruhn | 74/476 |
| 3,941,008 | 3/1976 | Cambria | 74/476 |
| 4,018,424 | 4/1977 | Latimer | 74/476 |
| 4,370,897 | 2/1983 | Carlo | 74/476 |

FOREIGN PATENT DOCUMENTS 2037914 7/1980 United Kingdom .................. 74/476

Primary Examiner—Kenneth J. Dorner
Assistant Examiner—Vinh Luong

[57] ABSTRACT

A power take-off lever arrangement for a tractor is disclosed which prevents the inadvertent shifting of the PTO lever to an engaged position. The lever arrangement includes a support plate secured to the tractor which has a pin extending outward from it which engages in a slot formed in the manually shiftable lever. Secured to the pin is an arcuate sector which has a recess formed in its arcuate surface. A roller, which is attached to the underside of the lever, will engage the recess when the lever is in a disengaged position and will ride on the arcuate surface when the lever is in an engaged position. The lever arrangement further includes a spring which is attached between the lever and the support plate to urge the roller into the recess when the lever is in the disengaged position. The spring also exerts a limited force on the lever when the lever is in the engaged position but the force is insufficient to affect either the stability of the lever in the engaged position or the movement of the lever to the disengaged position when the hydraulic pressure indirectly acting on a PTO control valve falls below a predetermined value.

9 Claims, 2 Drawing Figures

POWER TAKE-OFF LEVER ARRANGEMENT FOR A TRACTOR

FIELD OF THE INVENTION

This invention relates to a power take-off lever arrangement for a tractor which prevents inadvertent shifting of the lever to the engaged position.

BACKGROUND OF THE INVENTION

Most agricultural tractors and some industrial tractors are provided with a rear mounted power take-off drive which is used to transmit torque to an attached implement. Operation of the power take-off drive is controlled by a lever mormally mounted on the left-hand side of the steering column. This lever, which extends through the dashboard, is susceptible to being knocked as the driver enters or exits the tractor cab. This possibility of inadvertently engaging the power take-off (PTO) presents a safety risk especially to another person who may be working on the attached implement, which is connected to the PTO drive, in the belief that the PTO is disengaged.

Now a power take-off lever arrangement has been invented which will prevent inadvertent shifting of the lever to the engaged position.

SUMMARY OF THE INVENTION

Briefly, this invention relates to a power take-off lever arrangement for a tractor having a manually operable lever connected to a PTO control valve which hydraulically engages a power take-off drive. The control valve is responsive to move to an engaged position with corresponding movement of the lever and is spring biased to move to a disengaged position with corresponding movement of the lever when the hydraulic pressure falls below a predetermined value. The lever arrangement includes a support plate secured to the tractor which has a pin extending outward from it which engages in a slot formed in the lever. Secured to the pin is an arcuate sector which has a recess formed in its arcuate surface. A roller, which is attached to the underside of the lever, is designed to engage in the recess when the lever is in a disengaged position and will ride on the arcuate surface when the lever is in an engaged position. The lever arrangement further includes a spring which is attached between the lever and the support plate to urge the roller into the recess when the lever is in the disengaged position. The spring also exerts a limited force on the lever when the lever is in the engaged position but the force is insufficient to affect either the stability of the lever in the engaged position or the movement of the lever to the disengaged position when the hydraulic pressure indirectly acting on the control valve falls below the predetermined value. Such a lever arrangement assures the operator that the PTO drive cannot be inadvertently moved to the engaged position.

The general object of this invention is to provide a power take-off lever arrangement for a tractor which prevents inadvertent shifting of the PTO lever to the engaged position. A more specific object of this invention is to provide a power take-off lever arrangement for a tractor which is compatible with the automatic return of the PTO lever to the disengaged position when the hydraulic pressure in the system falls below a predetermined value.

Another object of this invention is to provide a simple and economical power take-off lever arrangement which cannot be inadvertently engaged.

Other objects and advantages of the present invention will become more apparent to those skilled in the art in view of the following description and the accompanying drawings.

DETAILED DESCRIPTION OF THE PREFERRED EMBODIMENT

Figure 1:
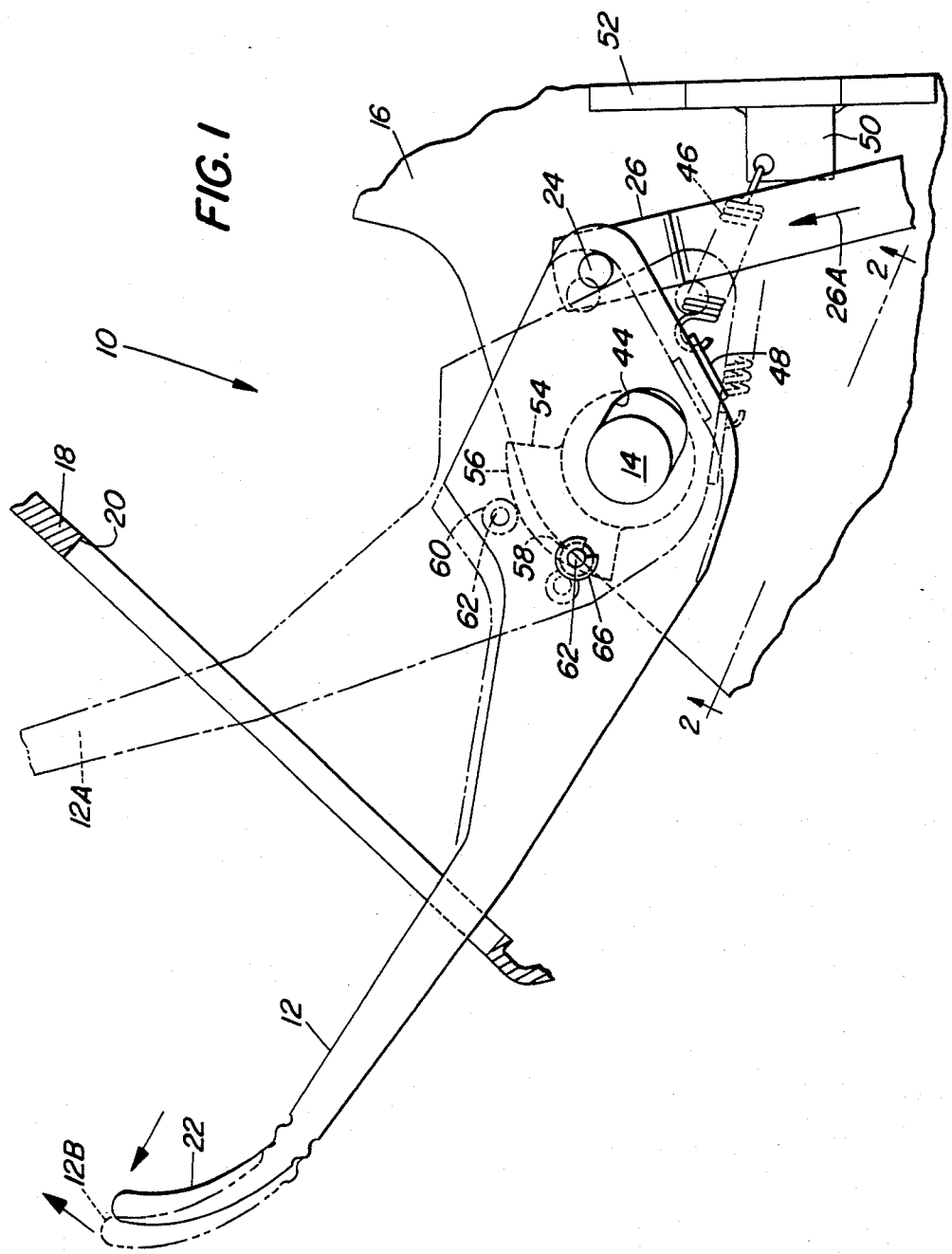
FIG. 1 is a side elevation view of the power take-off lever arrangement.

Referring to the drawings, a power take-off lever arrangement 10 is shown having a lever 12 which is pivotally attached by a pin 14 to a support plate 16. The support plate 16 is attached to the frame of a tractor behind a dashboard 18. The lever 12 projects through a slot 20 formed in the dashboard 18 and has a grip 22 formed on its exposed end for permitting an operator to move the lever 12 between a disengaged position (PTO drive is disengaged) shown in solid lines in FIG. 1, and an engaged position (PTO drive is engaged) shown at 12A in broken lines. Normally, the PTO shift lever 12 is located just to the left of the steering column of the tractor and is susceptible to being bumped or knocked as the operator enters or exits the tractor cab.

Figure 2:
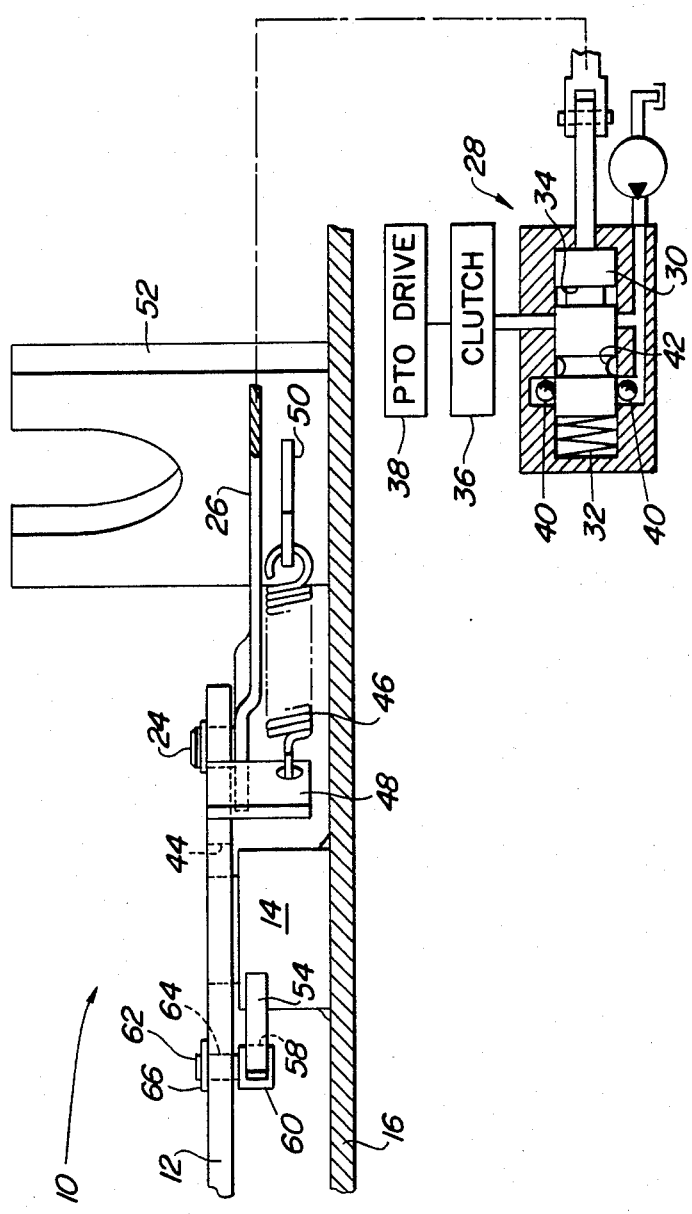
FIG. 2 is a view of the PTO lever arrangement from below taken along the line 2—2 of FIG. 1 and including a PTO control valve and drive.

An inner end of the lever 12 is pivotally connected by a stud 24 to a link 26 which is connected to a power take-off control valve 28, see FIG. 2. The PTO control valve 28 includes a movable spool 30 which is biased by a spring 32 to a disengaged position, indicated by the right most position in FIG. 2. As the PTO control valve 28 is moved to the left to an engaged position, hydraulic pressure from a supply source is directed via a groove 34, which is formed in the spool 30, to a hydraulically activated clutch 36. By engaging or disengaging the clutch 36, a power take-off drive 38 can be engaged or disengaged, respectively. When the PTO drive 38 is engaged, its output shaft rotates and this torque can be used to drive an attached implement.

Upon shifting the lever 12 to the engaged position 12A, the link 26 is moved such that it urges the spool 30 inward and compresses the spring 32. As this occurs, detent balls 40, positioned about the spool 30 and movable by hydraulic pressure, engage in a peripheral groove 42 formed in the spool 30. The detent balls 40 therefore will hold the spool 30 in the engaged position until the spool 30 is physically moved back to the right by movement of the lever 12 back to the disengaged position or when the hydraulic pressure acting on the detent balls 40 falls below a predetermined value. In the latter situation, the force of the spring 32 will move the spool 30 to the right and cause the detent balls 40 to move out of the groove 42. Such action will cause the link 26 to move outward, as indicated by arrow 26A in FIG. 1, and thus pivot the lever 12 back to the disengaged position. Details of a PTO control valve can be found in U.S. Pat. No. 4,296,649 which issued to Marquart in 1981 and which is hereby incorporated by reference and made a part hereof.

The lever 12 is pivotally mounted on the fixed pin 14 by way of an elongaged slot 44. The elongated slot 44 permits the lever 12 to move radially in and out relative to the dashboard 18. Besides being able to move in and out relative to the pin 14, the lever 12 is also urged inward, relative to the dashboard 18, by a tension spring 46 which is stretched between a lug 48 formed on the lever 12 and a lug 50 formed on a bracket 52 which in turn is secured to the support plate 16. Preferably, the tension spring is radially aligned with the elongated axis of the slot 28 when the lever 12 is in the disengaged position.

The PTO lever arrangement 10 further includes an arcuate sector 54 which is securely attached to the pin 14 such as by welding. The arcuate sector 54 has an arcuate circumferential surface 56 which is aligned concentric with the center of the pin 14. Formed in the arcuate surface 56 is a recess or notch 58, preferably semi-circular in shape, which is radially aligned with the elongated axis of the slot 44. Mateable with the recess 58 is a detent element 60, for example, a roller which is journaled on a pin 62 by permanently lubricated, low friction needle bearings. The pin 62 in turn is retained through an aperture 64 formed in the lever 12 by a clip 66 at a position such that the roller 60 is pulled into the recess 58 by the spring 46 when the lever 12 is in the disengaged position. The line of action of the spring 46 runs radially through the center of the pin 14 and through the center of the recess 58 so that a direct pull by the spring 46 serves to urge the roller 60 into the recess 58. In this situation, a sideward force on the lever 12 cannot possibly pivot the lever 12. In addition, any force, such as that created by the operator knocking the lever 12, wherein a force is compounded with an inward push on the lever 12 will not cause the lever 12 to pivot on the pin 14. Therefore, the lever 12 is secured against inadvertent or accidental movement from the disengaged position.

In order to move the lever 12 to the engaged position 12A, it is necessary that the operator first pull the lever 12 outward, against the force of the spring 46 to a position 12B (indicated by broken lines) before the lever 12 can be shifted to the engaged position 12A. When the lever 12 is in the engaged position 12A, the spring 46 will pull the roller 60 against the arcuate surface 56 of the sector 54 and will also create a force tending to turn the lever 12 back to the disengaged position. This force is small and, although it assists the bias of the spring 32 acting on the spool 30 of the PTO control valve 28, it will not overcome the holding action of the detent balls 40. If desired, the supplementary action on the tension spring 46 can be compensated for by a slight reduction in the strength of the bias spring 32 located in the PTO control valve 28.

If the hydraulic line pressure should fall below a predetermined value, whereby the detent balls 40 are no longer able to hold the spool 30 of the PTO control valve 28 in the engaged position, the link 26 will move outward. This action will cause the roller 60 to ride along the arcuate surface 56 of the sector 54 as the lever 12 pivots back to the disengaged position. The roller 60 will positively snap back into the recess 58 once the lever 12 reaches the disengaged position due to the force of the spring 46, since the frictional force exerted by the roller 60 on the arcuate surface 56 is very low. Likewise, when the lever 12 is pulled back by hand to the disengaged position, the spring 46 will ensure that the roller 60 snaps back into the recess 58.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A power take-off lever arrangement for a tractor having a manually operable lever connected to a control valve for hydraulically engaging a power take-off drive, said control valve being responsive to move to an engaged position with corresponding movement of said lever and being spring biased to move to a disengaged position with corresponding movement of said lever when hydraulic pressure falls below a predetermined value, said lever arrangement comprising:
   (a) a support plate secured to said tractor and having a pin extending outward therefrom, said pin engaging a slot formed in said lever;
   (b) an arcuate sector secured to said pin and having a recess formed in an arcuate surface thereof;
   (c) a roller attached to said lever which engages in said recess when said lever is in a disengaged position and which rides on said arcuate surface of said sector when said lever is in an engaged position; and
   (d) biasing means for urging said roller into said recess when said lever is in said disengaged position and which exerts a limited force on said lever when said lever is in said engaged position, said limited force being insufficient to affect the stability of said lever in said engaged position and being insufficient to affect the movement of said lever to said disengaged position when said hydraulic pressure indirectly acting on said control valve falls below said predetermined value.

2. The power take-off lever arrangement of claim 1 wherein said biasing means is a tension spring.

3. The power take-off lever arrangement of claim 1 wherein said arcuate surface of said sector is concentric with the pivotal axis of said lever.

4. The power take-off lever arrangement of claim 1 wherein said roller provides negligible frictional restraint to the pivotal movement of said lever on said arcuate sector.

5. The power take-off lever arrangement of claim 2 wherein said lever is mounted to project through a dashboard of said tractor and said biasing means urges said lever inwardly of said dashboard.

6. The power take-off lever arrangement of claim 1 wherein the elongated axis of said slot extends through the center of said recess when said lever is in said disengaged position.

7. A power take-off lever arrangement for a tractor having a manually operable lever connected to a control valve for hydraulically engaging a power take-off drive, said control valve being responsive to hydraulic pressure to move to an engaged position with corresponding movement of said lever and having a pressure-bias detent machanism which holds said control valve in said engaged position so long as said hydraulic pressure remains above a predetermined value and said control valve being spring biased to move to a disengaged position with corresponding movement of said lever or when said hydraulic pressure falls below a predetermined value, said lever arrangement comprising:

(a) a support plate secured to said tractor having a pin and a bracket extending outward therefrom, said pin engaging a slot formed in said lever;

(b) an arcuate sector secured to said pin and having a semi-circular recess formed in an arcuate surface thereof;

(c) a roller pinned to said lever which engages in said semi-circular recess when said lever is in a disengaged position and which rides on said arcuate surface when said lever is in an engaged position; and (d) a tension spring connected between said lever and said bracket for urging said roller into said semi-circular recess when said lever is in said disengaged position, said spring having a line of action which is aligned substantially radial with said semi-circular recess when said lever is in said disengaged position but which moves away from radial alignment when said lever is moved to said engaged position, said nonradial alignment creating a force on said lever tending to return said lever to said disengaged position, said force supplementing said spring bias force exerted on said control valve but being insufficient to overcome the action of said detent mechanism so long as said hydraulic pressure remains above said predetermined value.

8. The power take-off lever arrangement of claim 7 wherein the elongated axis of said slot extends through the center of said recess when said lever is in said disengaged position.

9. The power take-off lever arrangement of claim 7 wherein said arcuate surface of said sector is concentric with the pivotal axis of said lever.

* * * * *